J. W. GAMBLE & H. E. SIBSON.
ADJUSTABLE FLOW MEASURING APPARATUS.
APPLICATION FILED APR. 21, 1914.
1,247,952.
Patented Nov. 27, 1917.
2 SHEETS—SHEET 1.
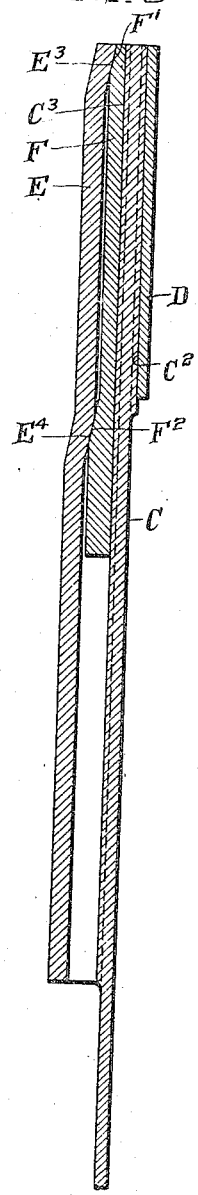
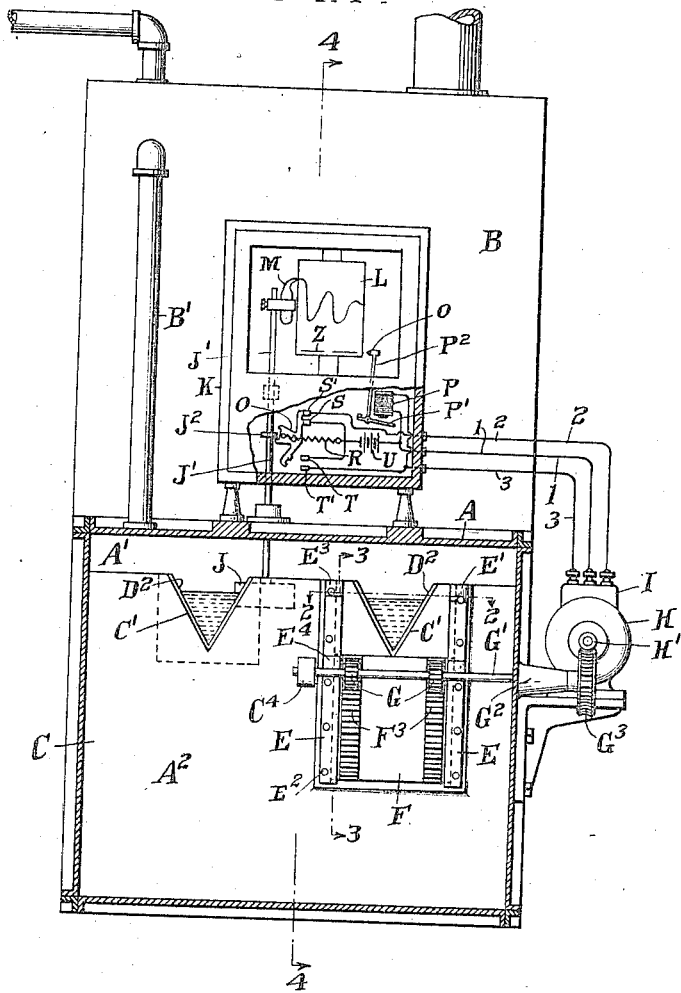

J. W. GAMBLE & H. E. SIBSON.
ADJUSTABLE FLOW MEASURING APPARATUS.
APPLICATION FILED APR. 21, 1914.

1,247,952.

Patented Nov. 27, 1917.
2 SHEETS—SHEET 2.

WITNESSES

INVENTOR

UNITED STATES PATENT OFFICE.

JOSEPH W. GAMBLE, OF PHILADELPHIA, AND HORACE E. SIBSON, OF CYNWYD, PENNSYLVANIA, ASSIGNORS TO JOSEPH S. LOVERING WHARTON, WILLIAM S. HALLOWELL, AND JOHN C. JONES, ALL OF PHILADELPHIA, PENNSYLVANIA, DOING BUSINESS AS HARRISON SAFETY BOILER WORKS.

ADJUSTABLE FLOW-MEASURING APPARATUS.

1,247,952.      Specification of Letters Patent.      Patented Nov. 27, 1917.

Application filed April 21, 1914. Serial No. 833,362.

*To all whom it may concern:*

Be it known that we, JOSEPH W. GAMBLE and HORACE E. SIBSON, both citizens of the United States of America, and residing, respectively, in the city and county of Philadelphia, State of Pennsylvania, and Cynwyd, Montgomery county, State of Pennsylvania, have invented certain new and useful Improvements in Adjustable Flow-Measuring Apparatus, of which the following is a true and exact description, reference being had to the accompanying drawings, which form a part thereof.

Our present invention relates to flow measuring apparatus of the type in which the rate of flow of a liquid through the discharge notches of a notched weir is determined by the varying accumulation of liquid on the supply side of the weir, and particularly to flow measuring apparatus of this type in which the weir tank is closed, as is necessary, for instance, in measuring hot water.

In carrying out our invention we provide a plurality of weir notches, all of which are open when the flow to be measured is at a maximum, and provide in conjunction therewith, means for closing one or more, but not all of said orifices when a lesser rate of flow is to be measured. By having a fraction only of the total number of weir notches open when the rate of flow is comparatively small, we may still obtain a sufficient variation in the height of liquid on the supply side of the weir to insure an easily read and accurate indication or record of the rate of flow; whereas, if all of the notches were then open, the variations in height of liquid level would be smaller, and the measurements less accurate and less easily read.

The primary object of our invention is to provide simple and effective means for opening and closing one of the weir notches in a closed weir tank, especially adapted for operation by means projecting out of the tank. Under some conditions it is desirable to, and our invention comprises means for automatically shifting the weir tank closing devices in response to the flow conditions prevailing. Our invention also comprises means for automatically indicating whether all the notches are open, or one or more of them are closed, and for making a continuous record of the condition of the apparatus in this respect.

The various features of novelty characterizing our invention are pointed out with particularity in the claims annexed to and forming a part of this specification. For a better understanding of the invention, however, and of the advantages possessed by it, reference should be had to the accompanying drawings and descriptive matter in which we have illustrated and described forms in which our invention may be embodied.

Of the drawings:

Figure 1 is an elevation, partly in section, of weir measuring apparatus embodying one form of our invention;

Fig. 2 is a partial section on the line 2—2 of Fig. 1;

Fig. 3 is an enlarged sectional elevation taken on the line 3—3 of Fig. 1;

Figure 4:
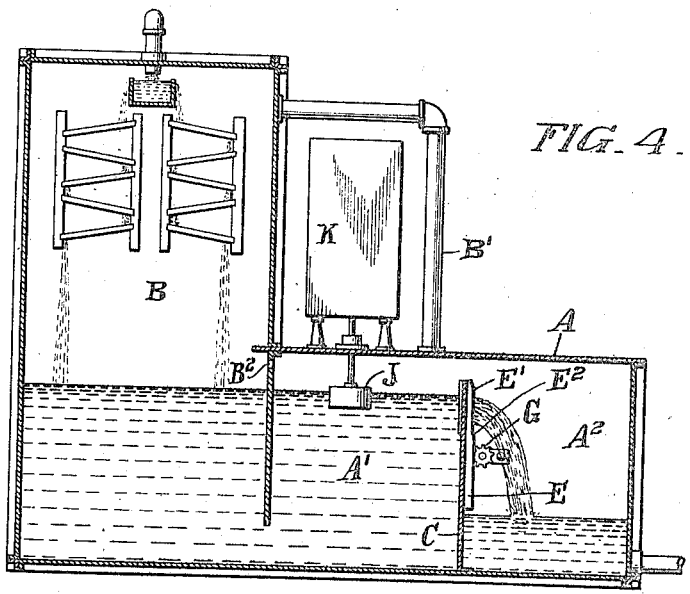
Fig. 4 is a sectional elevation taken on the line 4—4 of Fig. 1.

In the drawings, and referring first to the construction shown in Figs. 1 to 6, A represents a closed weir tank, having inlet and outlet chambers A' and A², respectively, separated by a partition C. As shown, the water to be measured passes into the chamber A' from an open water heater B, as in the combined meter and heater shown by the patent to Gibson, No. 1,015,556, granted January 23, 1912. In a measuring apparatus of this kind the tank A must be a closed tank, and the vapor space thereof should be connected to the steam space of the heater B, as by the equalizing connections B' and B². The weir plate support C is shown as formed with V-shaped notches C', through which the discharge from the chamber A' takes place. As shown, however, the weir notches proper are the V-shaped notches D² formed in weir plates D secured, as by the bolts D', against the raised seats C² formed for the purpose on the supply side of the plate C at the margin of the notches C'.

A sliding gate F, which fits against a seat C³ provided for the purpose on the outlet side of the weir plate C at the margin of the right hand notch C', forms a means for closing said notch. The gate F works in the guideways receiving the vertical edges of the gate. To form these guideways, channeled guide strips E are secured to the partition plate C by bolts E². To seal the joint between the gate F and the seat C³, when the gate F is elevated, we provide the channeled guide E with beveled shoulders E³ and E⁴, respectively. These shoulders engage corresponding beveled surfaces F' and F² on the gate F to thereby wedge the gate F snugly against the seat C³, as shown in Fig. 3, when the gate F is in its elevated position. The means shown in Figs. 1 and 2 for raising and lowering the gate F, comprise two rows of rack teeth F³ on the gate F, in mesh with spur gears G mounted on the shaft G' which projects through the wall of the tank and has a bearing C⁴ for its inner end carried by the partition C. A stuffing box G² is provided to prevent leakage out of the tank along the shaft G. It will be understood, of course, that the gate F when in its lower open position should not interfere with the free discharge through the corresponding weir notch, and for the same reason the guides E and spur gears G should be so located as not to interfere with the discharge through the weir notch.

In the apparatus shown in Figs. 1 to 6, we have provided means for automatically shifting the gate F into its closed position and back into its open position in response to variations in the height of liquid level on the supply side of the weir. This we accomplish by means of an electric motor H, and controlling means for this motor automatically adjusted by the rise and fall in the liquid level in the chamber A', as by means of the float employed to operate the recording mechanism. As shown in the drawings, the shaft of the electric motor H carries a worm H', in mesh with the worm gear G³ carried by the outer end of the shaft G'. I represents the automatic motor controlling mechanism proper, which has electrical connections running into the recording mechanism casing, and is connected therein to mechanism, as hereinafter explained.

In the simple and somewhat conventional form illustrated in the drawings, the recording mechanism located in the casing K, comprises a clock driven drum L carrying a chart, and a recording device M directly connected to a stem J'. The latter is connected to a float J rising and falling with the water level in the chamber A'. As shown, the float stem J' carries within the casing K a collar J² adapted to engage the prongs Q² and Q³ of a pivoted member Q, accordingly as the collar J² is moved up and down by the float J. When the collar J² engages the prong Q³ on a downward movement from the position shown in Fig. 5, the member Q, which is pivoted at Q', is shifted from the full line position of Fig. 5 into the dotted line position. When thereafter the collar J² is returned to the position shown in Fig. 5, the prong Q² is engaged and the member Q shifted back into the full line position. A spring R is connected to the member Q in such fashion that it tends to bring about the final portion of the movement of the member Q into either the full line or dotted line positions. The member Q engages, and electrically connects spring contacts S and S', when the member Q is in its full line position of Fig. 5, and when in the dotted line position, engages and electrically connects spring contact members T and T'. The contacts S and T are connected to one side of a suitable source of current, as the battery U. The other side of the battery U is connected by the conductor 1 to one terminal of the controlling box I. The contacts S' and T' are connected by conductors 2 and 3, respectively, to the other terminals of the controlling box I.

Figures 5, 6, 7:
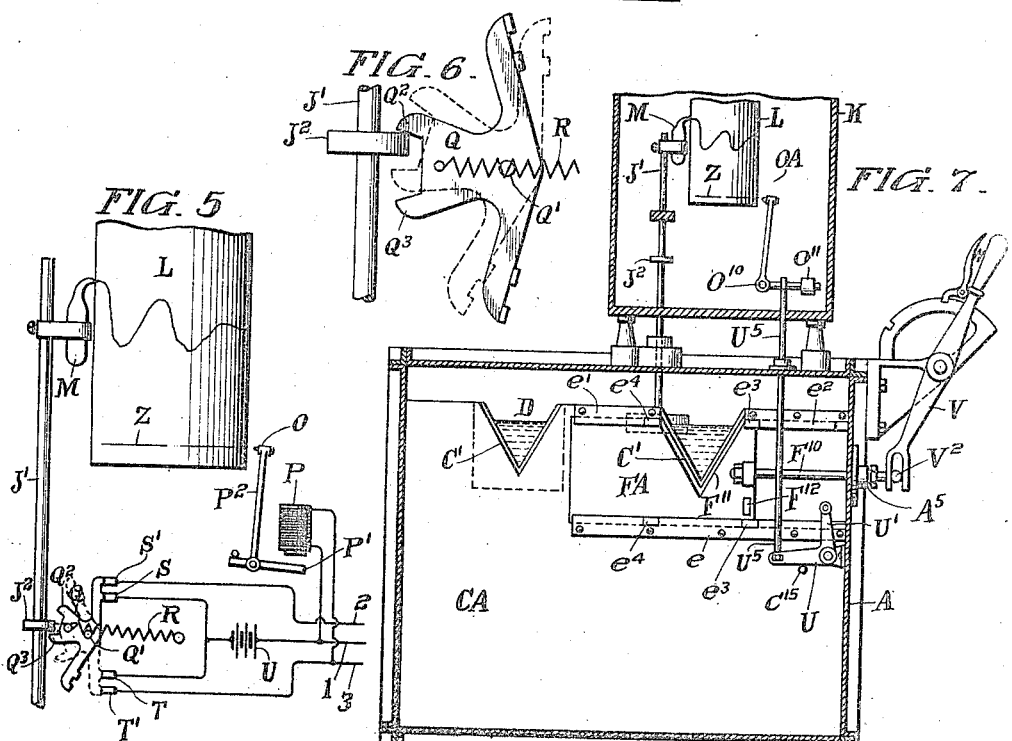
Fig. 5 is a view taken similarly to Fig. 1, but on a larger scale and showing a portion only of the apparatus shown in Fig. 1.
Fig. 6 is an elevation of a portion of the apparatus shown in Fig. 5.
Fig. 7 is a sectional elevation, with parts broken away, of a portion of a modified form of measuring apparatus embodying our invention.

The starting mechanism is so arranged that when the member Q is moved into the full line position of Fig. 5 connecting the contacts S and S', thereby causing current to pass from the source of current U through the conductors 1 and 2 to the motor controlling box I, the motor H is thereby set into rotation in the direction to lower the gate F from its closed position into its wide open position. Similarly, when the member Q is shifted into the dotted line position of Fig. 5, thereby connecting contacts T and T', current flows from the source of current U through the conductors 1 and 3 to the controlling box I to thereby cause the motor H to be rotated in a direction to move the gate F from its lower or open position into its upper or closed position. It is not necessary for me to describe the mechanism in the box I, employed to start the motor, and to interrupt the supply of current thereto when the gate F reaches the limit of its movement in either direction, as control mechanism of this general character is well known to those skilled in the art.

With the arrangement shown in Figs. 1 to 6 there is an appreciable though definite range through which the water level in the chamber A' may fluctuate without causing the gate F to be moved. This range of movement is equal to the range of movement of the collar J² between the prongs Q² and Q³ while the member Q is held stationary in the position shown in full lines in Fig. 6. With this arrangement, after the lever Q has been shifted from one position to the other, a slight motion of the float J opposite in direction to that which brought about the shift in position of the member Q, will not bring about a return movement of the member Q. This is desirable, because it prevents undesirable and unnecessarily frequent changes in position of the gate.

Advantageously, we provide means for indicating the position of the gate F, and recording its position at different times. This we accomplish with the apparatus shown in Figs. 1 to 6 by means of the electromagnet P, the terminals of which are connected to the conductors 1 and 3, so that the electromagnet is energized whenever and while the contacts T and T' are connected by the member Q; that is, while the gate F is in its closed position. The weighted armature P' of the electromagnet P carries a flexible arm $P^2$ supporting a marking device O at its free end. When the electromagnet P is energized and the armature P' attracted, the marking device O is pressed against the record chart, tracing a line Z, which is interrupted whenever the member Q is shifted to disconnect the contacts T and T', the weight of the armature P' then carrying the marking device O out of contact with the record chart.

In the modified construction shown in Fig. 7, the gate FA is horizontally movable, working in guides $e$, $e'$ and $e^2$, which are formed with wedging surfaces $e^3$ and $e^4$ corresponding to the surfaces $E^3$ and $E^4$, and coöperating with inclined surfaces on the gate FA, similar to the surfaces F' and $F^2$ on the gate F. In the particular construction shown in Fig. 7, the gate FA is provided with an operating stem $F^{10}$ which projects through the stuffing box $A^5$ secured to the side wall of the tank A. Externally of the tank A the stem $F^{10}$ is connected to an operating lever V, by means of which the gate FA may be manually shifted back and forth between its open and closed positions at the will of the attendant. The gate FA is formed with a notch $F^{11}$ which registers with the corresponding notch C' in the open position of the gate. In this form of our invention the position of the lever V indicates whether the gate FA is open or closed. A record of the position of the gate FA at different times is obtained by means of a marking device OA, which is pivotally mounted at $O^{10}$, and is provided with a weight $O^{11}$ tending to hold the marking point away from the record chart carried by the drum L. The weighted lever U, pivotally mounted on the weir plate support or partition CA, is provided with an arm U' which is engaged by the lug $F^{12}$ on the gate FA as the latter is moved into its fully closed position. This shifts the lever U out of its normal position in which it rests upon the stop $C^{15}$. When the lever U is thus shifted it elevates the rod $U^5$ passing upward through the top wall of the tank A into the bottom of the case K, and thereby causes the marking device OA to be thrown against the record surface, while in the normal position of the lever U, in which the weighted arm engages the stop $C^{15}$, the marking device OA is held out of contact with the chart by the weight $O^{11}$.

While in accordance with the provisions of the statutes we have illustrated and described the best forms of our invention now known to us, it will be apparent to those skilled in the art that changes may be made in the forms of apparatus disclosed without departing from the spirit of our invention, and that under some conditions certain features of our invention may be used without a corresponding use of other features.

Having now described our invention, what we claim as new and desire to secure by Letters Patent, is:

1. In a flow meter, comprising a weir chamber, a weir member forming a part of the wall of said chamber and formed with a plurality of weir notches, a suitably mounted gate, movable to open and close one of said weir notches, and flow exhibiting means, responsive to the accumulation of liquid in said weir chamber and adapted to exhibit the flow with either setting of the gate.

2. In a flow meter, the combination with a weir tank and a partition therein separating the tank into inlet and outlet compartments, and formed with a plurality of weir notches, of a gate mounted in said tank for movement between two positions in one of which it permits while in the other it prevents flow through one of said notches, and flow exhibiting means responsive to the accumulation of liquid in said inlet compartment and adapted to exhibit the flow with either setting of the gate.

3. In a notched weir meter, the combination with a closed weir tank and a partition therein separating the tank into inlet and outlet compartments and formed with a plurality of weir notches, of a gate mounted in said tank for movement between two positions in one of which it permits and in the other of which it prevents the flow through one of said notches, flow exhibiting means responsive to the accumulation of liquid in said inlet compartment, and indicating means external to the tank for indicating the position occupied by the gate.

4. In a flow meter, the combination with a closed weir tank and a partition therein separating the tank into inlet and outlet compartments and formed with a plurality of weir notches, of a gate mounted in said tank for movement between two positions in one of which it permits and in the other of which it prevents flow through one of said notches, flow exhibiting means responsive to the accumulation of liquid in said inlet compartment and adapted to exhibit the flow with either setting of the gate, and a gate actuating device extending through the wall of said tank.

5. In a flow meter, the combination of a partition member formed with a plurality of weir notches and means automatically responsive to the height of liquid level on the inlet side of said partition member for abruptly opening and closing one of said notches at the end of a predetermined variation in said height of liquid level.

6. In a flow meter, the combination with a partition member formed with a plurality of weir notches, of apparatus coöperating therewith to measure the flow through said notches comprising a float rising and falling with the height of liquid level on the supply side of said partition member, and means controlled by said float for abruptly opening and closing one of said notches at the end of a predetermined variation in said height of liquid level.

7. In a flow meter, the combination with a partition member formed with a plurality of weir notches, of means for opening and closing one of said notches, a recording mechanism comprising a chart and means for recording thereon the variations in the height of the liquid level on one side of said partition, and means automatically responsive to the actuation of the first mentioned means for making a record on said chart showing when said one notch is opened and closed.

JOSEPH W. GAMBLE.
HORACE E. SIBSON.

Witnesses:
ROBERT G. CLIFTON,
M. M. FULTON, Jr.

Copies of this patent may be obtained for five cents each, by addressing the "Commissioner of Patents, Washington, D. C."